US009421898B2

(12) United States Patent
Huet et al.

(10) Patent No.: US 9,421,898 B2
(45) Date of Patent: Aug. 23, 2016

(54) TRAILER FOR LIFTING A HEAVY LOAD AND METHOD FOR LIFTING THE HEAVY LOAD USING THE SAME

(76) Inventors: Guillaume Huet, Québec (CA); Steve Labrie, Québec (CA)

( * ) Notice: Subject to any disclaimer, the term of this patent is extended or adjusted under 35 U.S.C. 154(b) by 1045 days.

(21) Appl. No.: 13/538,572

(22) Filed: Jun. 29, 2012

(65) Prior Publication Data
US 2014/0003896 A1    Jan. 2, 2014

(51) Int. Cl.
*B60P 1/02* (2006.01)
*B60P 1/54* (2006.01)
*B66C 5/02* (2006.01)

(52) U.S. Cl.
CPC ............. *B60P 1/02* (2013.01); *B60P 1/5423* (2013.01); *B66C 5/02* (2013.01)

(58) Field of Classification Search
CPC ........ B60P 1/5423; B60P 1/02; B60P 1/6445; B66C 19/005; B66C 5/02
USPC .................. 212/324; 254/324; 414/460, 461; 187/272
See application file for complete search history.

(56) References Cited

U.S. PATENT DOCUMENTS

| | | | | |
|---|---|---|---|---|
| 2,147,451 A * | 2/1939 | Messina | ............................ | 188/5 |
| 2,695,682 A * | 11/1954 | Ehlinger | ............................ | 188/5 |
| 2,852,229 A * | 9/1958 | Gross | ....................... | B66F 3/24 254/134 |
| 3,494,492 A * | 2/1970 | Thiermann | .................... | 414/461 |
| 3,655,081 A * | 4/1972 | Monk | ............................ | 414/460 |
| 3,831,791 A * | 8/1974 | Gonzales | ...................... | 414/461 |
| 4,002,147 A | 1/1977 | Feterl | | |
| 4,479,634 A * | 10/1984 | Blatz | ......................... | B66F 7/10 248/354.5 |
| 4,763,800 A * | 8/1988 | Engler et al. | .................... | 212/324 |
| 4,861,219 A * | 8/1989 | Mayle | ............................ | 414/469 |
| 5,067,869 A | 11/1991 | Reuss et al. | | |
| 5,110,090 A * | 5/1992 | McDuffie | .................. | B66F 3/36 254/124 |
| 5,114,295 A * | 5/1992 | Jansson | ......................... | 414/460 |
| 5,174,415 A | 12/1992 | Neagle et al. | | |
| 5,415,516 A | 5/1995 | Richards | | |
| 5,690,315 A * | 11/1997 | Thomas | ..................... | B66F 3/24 187/272 |
| 5,839,876 A | 11/1998 | McCarthy et al. | | |
| 6,354,769 B1 * | 3/2002 | Allen | ..................... | B66B 19/007 187/205 |
| 6,364,601 B1 * | 4/2002 | Picarello et al. | .............. | 414/460 |
| 6,394,743 B1 | 5/2002 | Marsden et al. | | |
| 6,490,906 B1 | 12/2002 | Bailey | | |
| 6,547,217 B1 | 4/2003 | Dygert | | |
| 6,655,895 B1 | 12/2003 | Dahl | | |
| 7,182,375 B1 | 2/2007 | Shoen | | |
| 7,524,159 B2 | 4/2009 | Mammone et al. | | |
| 7,934,742 B2 | 5/2011 | Anderson et al. | | |
| 8,444,361 B1 * | 5/2013 | Hershey | ........................ | 414/460 |
| 2003/0180132 A1* | 9/2003 | Morreim | ....................... | 414/458 |

FOREIGN PATENT DOCUMENTS

| | | | | |
|---|---|---|---|---|
| FR | 2659073 A1 * | 9/1991 | ................ | B66C 5/02 |
| FR | 2825081 A1 * | 11/2002 | ................ | B66C 5/02 |

* cited by examiner

*Primary Examiner* — James Keenan
(74) *Attorney, Agent, or Firm* — Benoît & Côoté Inc.

(57) ABSTRACT

The present document describes a trailer for lifting a heavy load, the trailer comprising a base frame defining an opening for receiving the load upon displacement of the trailer toward the load; and a structural frame upwardly extending from the base frame, the structural frame including a lifting frame above the heavy load for removable attachment to the heavy load; and a lifting device for lifting the heavy load removably attached to the lifting frame and thereby to permit displacement of the heavy load with the trailer.

20 Claims, 4 Drawing Sheets

TRAILER FOR LIFTING A HEAVY LOAD AND METHOD FOR LIFTING THE HEAVY LOAD USING THE SAME

BACKGROUND (a) Field

The subject matter disclosed generally relates to equipment for lifting of heavy loads and associated methods. More particularly, the subject matter disclosed relates to trailers for lifting electrical transformers and to associated methods.

(b) Related Prior Art

The transportation industry of heavy loads currently employs a diversity of vehicles to haul and deliver heavy loads from a source site to an end site. For this purpose, various types of trailers are used in many commercial and industrial applications to convey differently sized heavy loads to their destination. Presently, because of their substantial heavy load capacity, trailers comprise a principal mode of conveyance for both large and small heavy loads.

Most generally, a trailer may refer to an unpowered vehicle pulled by a powered vehicle for displacing a heavy load or a plurality of heavy loads. For instance, it is common for heavy loads to be towed on a trailer behind a vehicle for allowing safety transport of the heavy loads.

There exist many trailers on the market for allowing different types of heavy loads to be transported. For example, for a boat to be transported, a trailer may be backed onto a boat ramp to allow such boat to be launched stern first while still carried at the boat's trailed height. For allowing the boat to get on the trailer, the trailer needs to be backed onto a boat ramp and underneath the surface of the water to get the boat out of the water and on the trailer.

As another example, transportation of two-wheeled vehicles, particularly motorcycles, is typically facilitated by a trailer. However, the two-wheeled vehicles need to be loaded onto the trailer by means of a rigid ramp or a plurality of rigid ramps.

As a further example, U.S. Pat. No. 5,415,516 describes a compact utility trailer for pick-up and delivery of relatively small sized lots of material which is towable behind a variety of commonly driven vehicles such as automobile, pick-up trucks and the like. The trailer described contains a hand operated hydraulic jack-operated forklift that allows a pallet of material to be easily seized and lifted into a transportation position within the confines of the trailer.

As described above, various trailers may lift and transport a heavy load from the source site to the end site. However, these trailers need to be operated in optimal conditions. Indeed, the level on the ground needs to be relatively flat and nonobstructed in the case of the trailer described in U.S. Pat. No. 5,415,516 for the horizontal fork or finger elements to displace under a pallet of material and to lift it over the ground surface. Moreover, the trailer used for lifting a two-wheeled vehicle needs to be loaded onto the trailer by means of a rigid ramp or a plurality of rigid ramps. Furthermore, the boat may be lifted on a trailer since the water permits the trailer to displace above the boat using a ramp.

Thus, it is easy to install a heavy load in a trailer when the heavy load is supported by wheels, when the trailer may easily be displaced underneath the trailer (i.e., under water for instance), when the ground surface in nonobstructed and the like.

However, most of the time it can be hazardous to lift a heavy load in a trailer since the trailer cannot be displaced underneath the heavy load or since the ground surface is obstructed, i.e., obstructed by snow, by branches, by a rugged area and the like.

Finally, another consideration is access to the site of the heavy load. Consider the case of electrical transformers (or power converters) for wind turbines which must be maintained or replaced. Such wind turbines are often located in remote locations which are difficult to access, for example, in winter time when the ground and access roads are covered with snow or rendered inaccessible thereby. In such cases, the access roads and the area around the electrical transformer must be cleared of the snow in order to bring the lifting and towing equipment to the site of the electrical transformer. The cost of clearing the snow from the access road is expensive and it is therefore desirable to reduce or completely avoid such expenses.

There is therefore a need for an improved trailer for lifting a heavy load and for a method for lifting the heavy load to overcome these previously described disadvantages.

SUMMARY

According to an embodiment, there is provided a trailer for lifting a heavy load, the trailer comprising a base frame defining an opening for receiving the load upon displacement of the trailer toward the load; a structural frame upwardly extending from the base frame, the structural frame including a lifting frame above the heavy load for removable attachment to the heavy load; and a lifting device for lifting the heavy load removably attached to the lifting frame and thereby to permit displacement of the heavy load with the trailer.

According to another embodiment, the lifting frame movably extends from the structural frame for adopting a plurality of vertical lifting positions relative to the structural frame, the lifting frame including a corresponding mating connector downwardly extending towards the heavy load for removably engaging with a mating connector of the heavy load when positioned within the base frame.

According to another embodiment, the lifting device is located between the structural frame and the lifting frame for lifting the lifting frame from one of the plurality of vertical lifting positions to another one of the plurality of vertical lifting positions, thereby lifting the heavy load over the base frame.

According to another embodiment, the lifting device comprises at least one of a hydraulic lifting device.

According to another embodiment, the lifting frame further comprise vertical members for movably engaging the structural frame, the vertical members of the lifting frame defining a vertical direction parallel to the vertical direction of the structural frame.

According to another embodiment, the trailer may further comprise a pin and wherein vertical members comprises a plurality of holes in vertical members, each one of the plurality of holes corresponding to another hole in the lifting device, and wherein one of the plurality of holes in vertical members and the other hole in the lifting device are defined for receiving the pin for lifting the lifting frame and a part of the lifting device in one of the plurality of vertical lifting positions relative to the structural frame.

According to another embodiment, the opening forms one of: a V-shaped configuration, a C-shaped configuration, an open regular polygonal-shaped configuration, and an open irregular polygonal-shaped configuration.

According to another embodiment, the heavy load defines a width W1 and wherein the opening defined by the base frame defines a width W2 greater than the width W1.

According to another embodiment, the base frame defines a longitudinal plan and the structural frame defines a vertical direction and wherein the vertical direction of the structural frame is substantially perpendicular to the longitudinal plan of the base frame.

According to another embodiment, the trailer may further comprise a removable supporting section for removable engagement with the base frame for supporting the heavy load after lifting of the heavy load.

According to another embodiment, the removable supporting section may comprise a plurality of primary transversal bars engaged with the base frame and a plurality of secondary transversal bars perpendicularly removably fixed to the plurality of primary transversal bars.

According to another embodiment, the corresponding mating connector of the lifting frame is movable and adjustable to engage with the mating connector of the load in a vertical relationship.

According to another embodiment, the corresponding mating connector comprises an extending section downwardly extending from a horizontal lifting member of the lifting frame, the extending section comprising a plurality of holes, the corresponding mating connector further comprising a strap extending from one of the plurality of holes for engaging with the mating connector of the heavy load, the horizontal lifting member being perpendicularly and upwardly extending from the engaging portion.

According to another embodiment, the trailer may further comprising a pull and push mating connector extending from the base frame for removably engaging with another pull and push mating connector of a vehicle.

According to another embodiment, the base frame further comprises one of: skis, wheels and tracks for displacing the base frame in the lateral direction.

According to another embodiment, the base frame further comprises a brake system opposite to the opening defined by the base frame for braking the base frame.

According to another embodiment, the brake system comprises a plurality of rigid elements extending downwardly from the base frame.

According to another embodiment, the lifting frame, the base frame and the structural frame define a squared cross-sectional area.

According to another embodiment, the lifting device further includes a jack having an end and another pushing end, a jack supporting section for supporting the end of the jack, and a jack pushing section for interfacing with the other pushing end of the jack.

According to another embodiment, the jack supporting section extends from the structural frame.

According to another embodiment, there is provided a method for lifting a heavy load defining an external surface and a mating connector on the external surface, the method comprising the steps of: displacing a lifting frame toward and above the heavy load, the lifting frame removably extending from a structural frame, the structural frame extending from a base frame defining an opening for receiving the heavy load when displaced in a lateral position relative to a ground surface; removably engaging a corresponding mating connector of the lifting frame with the mating connector of the heavy load when positioned within the base frame; lifting the heavy load equal or above a level defined by the base frame; and removably engaging a supporting section with the base frame for supporting the heavy load when the lifting frame adopts one of a plurality of lifting positions.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In embodiments there are disclosed a trailer for lifting a heavy load and a method for lifting a heavy load.

Figure 1:
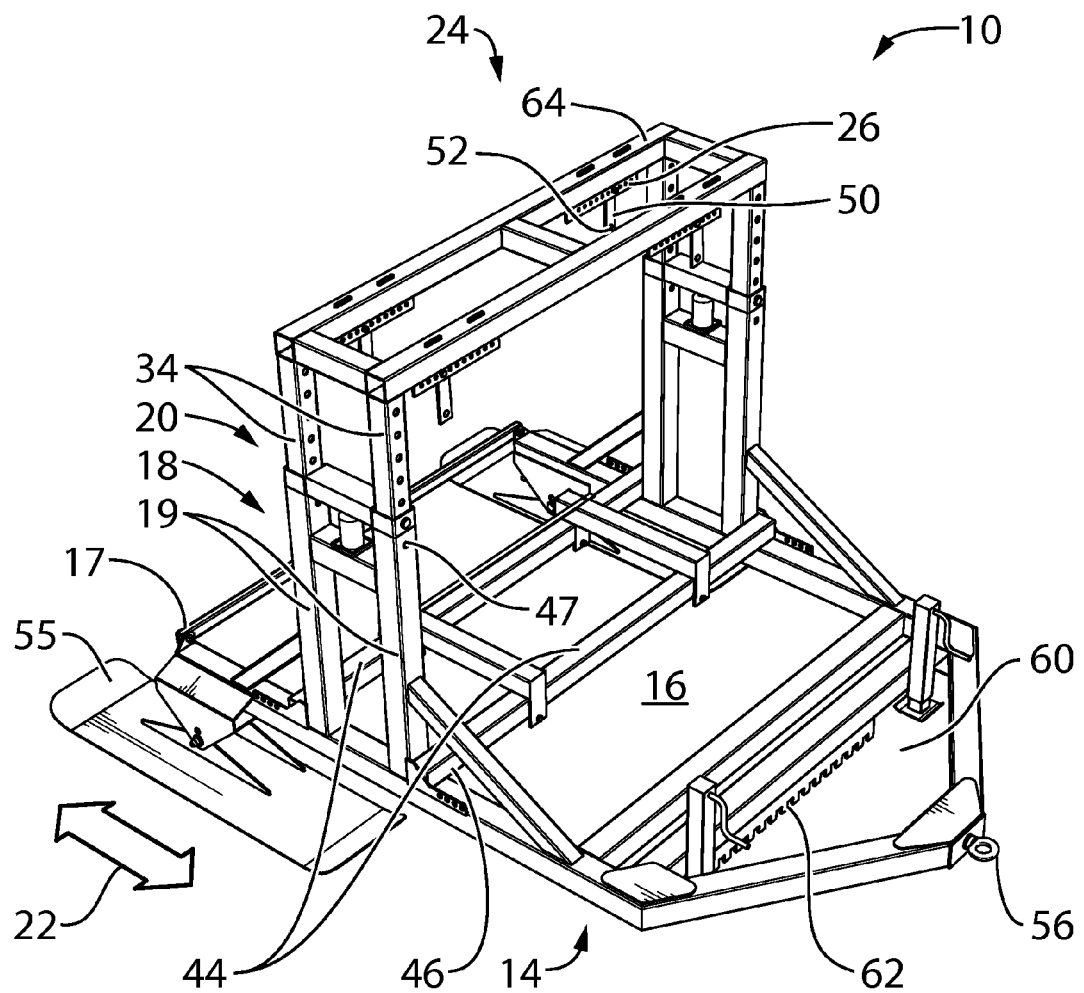
FIG. 1 is a top perspective view of a trailer for lifting a heavy load, shown without the heavy load, in accordance with an embodiment.
Figure 2A:
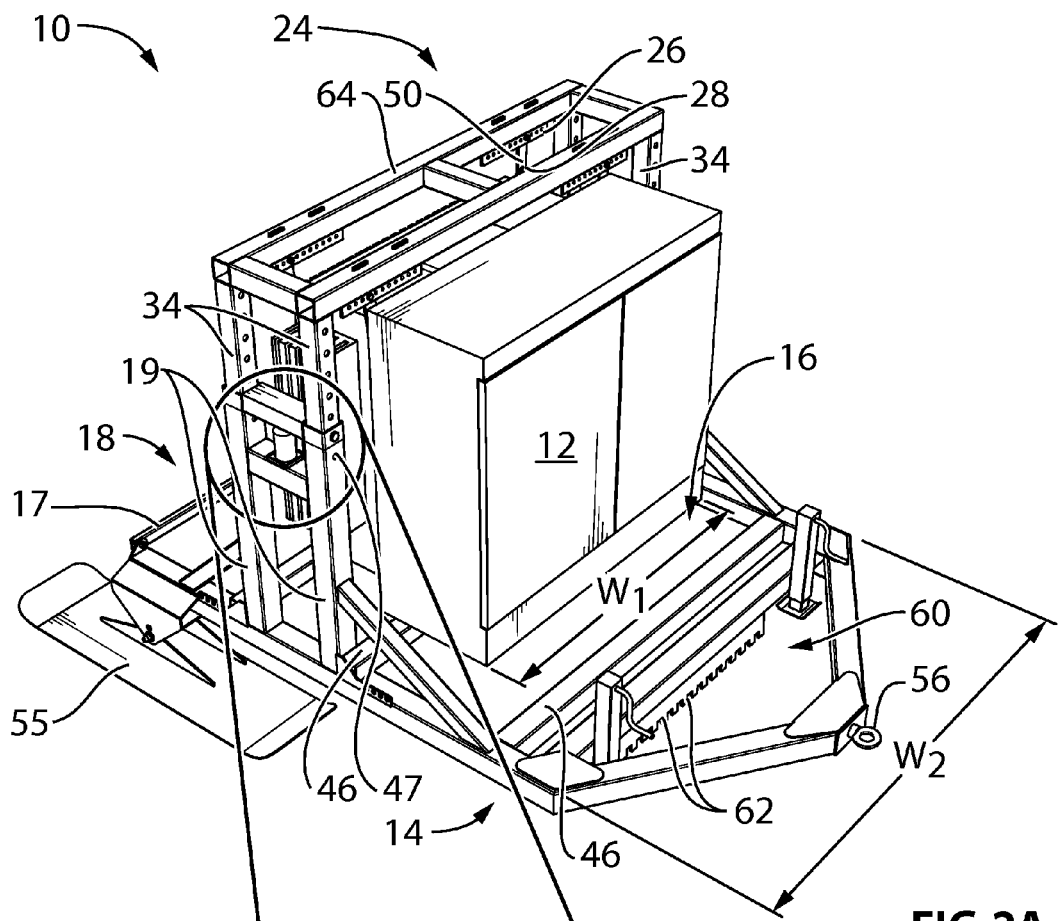
FIG. 2A is a top perspective view of the trailer of FIG. 1 shown with a lifted heavy load.

Referring now to the drawings, and more particularly to FIGS. 1 and 2A, there is shown a trailer 10 for lifting a heavy load 12 (FIG. 2A). In an embodiment, the heavy load 12 comprises an electrical transformer. It is to be noted that FIG. 1 illustrates a perspective view of the trailer 10 shown without the heavy load 12, while FIG. 2A illustrates a perspective view of the trailer 10 with a lifted heavy load 12. The trailer 10 includes a base frame 14 which defines an opening 16 for receiving the heavy load 12 upon displacement of the trailer 10 toward the heavy load 12. The trailer 10 also includes a structural frame 18 which upwardly extends from the base frame 14. The structural frame 18 is for removable attachment to the heavy load 12. The structural frame 18 comprises vertical posts 19 which each have a hole 47. The trailer 10 includes a lifting device 20 for lifting the heavy load 12. The lifting device 20 permits displacement of the heavy load 12 with the trailer 10.

Still referring to FIGS. 1 and 2A, there is shown that the trailer 10 may further include a lifting frame 24 which movably extends from the structural frame 18. The lifting frame 24 of the trailer 10 may adopt a plurality of vertical lifting positions relative to the structural frame 18. The lifting frame 24 may include a corresponding mating connector 26 which downwardly extends towards the heavy load 12 for removably engaging with the mating connector 28 of the heavy load 12 when positioned within the base frame 14.

Moreover, the trailer 10 may further include a lifting device 20 provides the interface between the structural frame 18 and the lifting frame 24 for lifting the structural frame 18 from one of the plurality of vertical lifting positions to another one of the plurality of vertical lifting positions. This allows lifting the heavy load 12 over the base frame 14. The embodiments detailed herein show a lifting device 20 on either side of the heavy load 12.

According to an embodiment, the opening 16 forms, without limitations, one of a V-shaped configuration, a C-shaped configuration, an open regular polygonal-shaped configuration, an open irregular polygonal-shaped configuration, and the like.

According to another embodiment, and referring to FIG. 2A, the heavy load 12, defines a width W1 and the opening 16 defined by the base frame 14 defines a width W2 greater than the width W1 of the heavy load 12.

According to another embodiment, the base frame 14 generally defines a longitudinal plan 30 (FIG. 3) and the structural frame 18 generally defines a vertical direction 32. The vertical direction 32 of the structural frame 18 is substantially perpendicular to the longitudinal plan 30 of the base frame 14.

Now referring to FIGS. 2A, 2B, 3 and 4, there is shown that the lifting frame 24 may further include vertical members 34 for movably engaging the structural frame 18. Vertical members 34 of the lifting frame 24 defines a vertical direction 36 substantially parallel to the vertical direction 32 (FIG. 3) of the structural frame 18. In the embodiment shown herein, the number of vertical members 34 corresponds to the number of vertical posts 19. Although there are four vertical members 34 and four vertical posts 19 shown, this description is meant to include embodiments where one, two, three or more vertical members 34 and vertical posts 19 would be present.

Figure 2B:
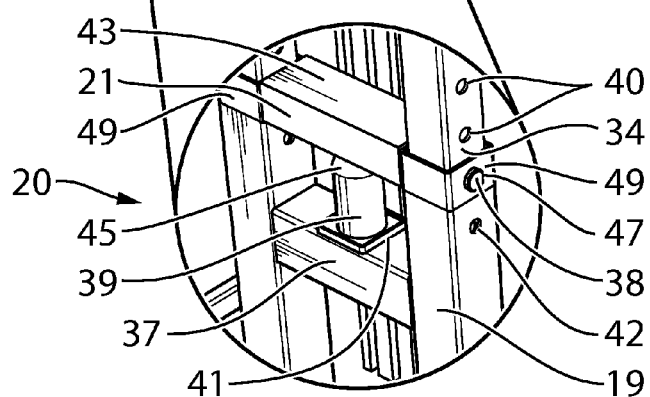
FIG. 2B is a close up view of a lifting device of the trailer of FIG. 2A.

As shown in FIG. 2B, lifting device 20 comprises a vertical lifting bar 21 which includes a jack pushing section 43 with a sliding adaptor 49 at each end thereof. The sliding adaptors 49 each comprise a hole 47. The sliding adaptors 49 are made to rest on vertical posts 19 while having a hollow section (not numbered) through which the vertical members 34 are free to slide.

Also, vertical members 34 comprise a plurality of holes 40 in vertical members 34. Each one of the plurality of holes 40 corresponds to hole 42 in the vertical lifting bar 21 of lifting device 20. The holes 40 in vertical members 34, hole 42 in vertical post 19 and hole 47 in sliding adaptor 49 of lifting device 20 are defined for receiving the pin 38 which retains the lifting frame 24 in one of the plurality of vertical lifting positions. In this way, when the pin 38 is engaged in both one of the plurality of holes 40 of vertical members 34 and the other holes 47 of sliding adaptors 49, vertical members 34 and sliding adaptors 49 may be upwardly displaced relative to the structural frame 18 using jack 39 (discussed below).

Another pin 38 (not shown) may be engaged in hole 42 and then in another one of the plurality of holes 40 (in the part of vertical member 34 which is within vertical post 19), for locking in place the lifting frame 24 at one of its vertical lifting positions.

Still referring to FIG. 2B, there is shown that the lifting device 20 may include a jack 39, such as a hydraulic jack, a jack supporting section 37 for supporting a bottom end 41 of the jack 39, and a jack pushing section 43 against which pushing end 45 of the jack 39 pushes. It is to be noted that the jack supporting section 37 extends between two vertical posts 19.

According to an embodiment, jack 39 comprises a hydraulic jack. It is to be noted that hydraulic jack be replaced by any other suitable lifting device, i.e., a mechanic lifting device, an electric lifting device, a pneumatic lifting device, and the like.

Figure 3:
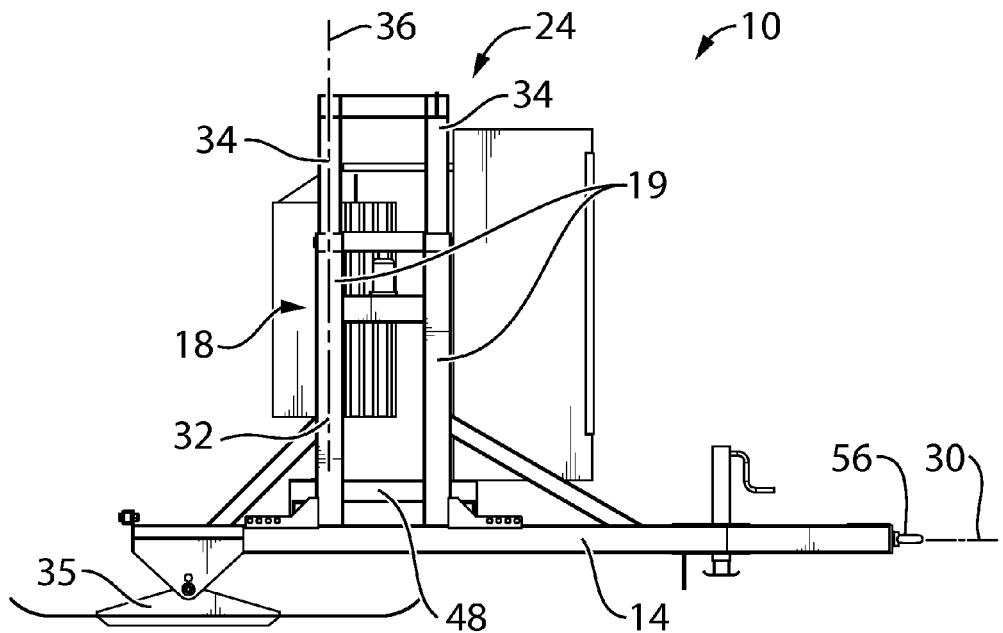
FIG. 3 is a side elevation view of a trailer of FIG. 2A.
Figure 4:
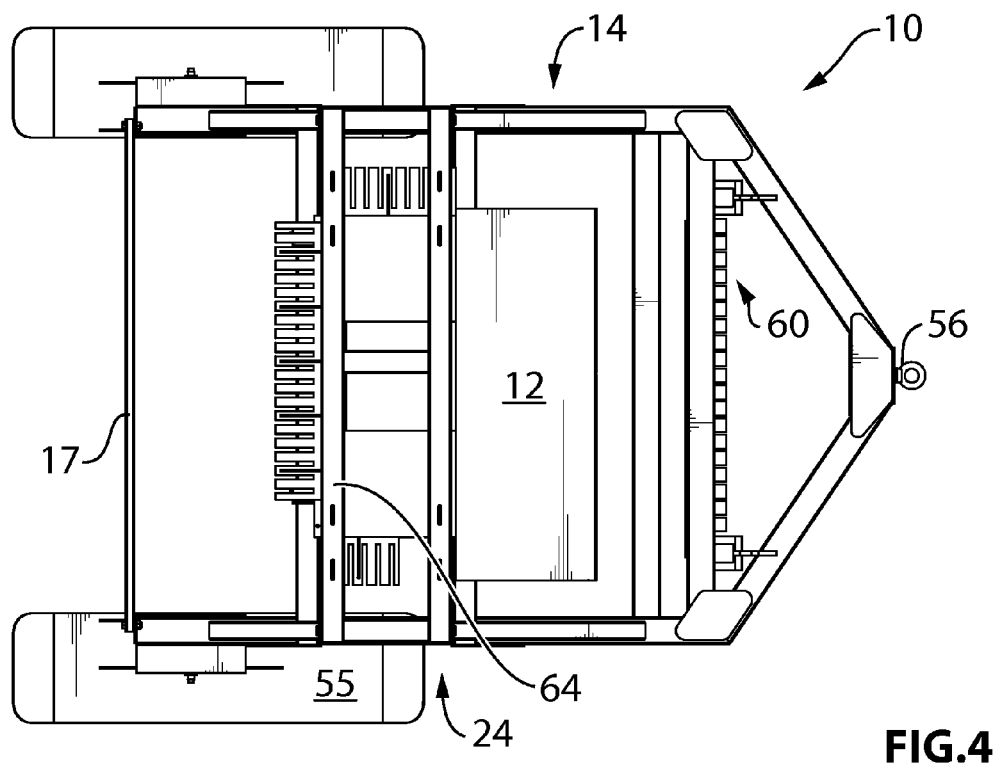
FIG. 4 is a top view of the trailer of FIG. 2A.

According to another embodiment and still referring to FIGS. 1 and 2A and to FIGS. 3 and 4, the trailer 10 further includes a removable supporting section 44 for removable engagement with the base frame 14 for supporting the heavy load 12 after lifting of the heavy load 12 using the lifting device 20 and the lifting frame 24. The removable supporting section 44 may include a plurality of primary transversal bars 46 engaged with the base frame 14 and a plurality of secondary transversal bars 48 perpendicularly fixing together the plurality of primary transversal bars 46.

According to another embodiment, the corresponding mating connector 26 of the lifting frame 24 is movable and adjustable to engage with the mating connector 28 of the heavy load 12 in a vertical relationship. The corresponding mating connector 26 may include an extending section 50 which downwardly extends from a horizontal lifting member 64 of the lifting frame 24. The extending section 50 may include a plurality of holes 52. The corresponding mating connector 26 may further include a strap 54-which extends from one of the plurality of holes 52 for engaging with the mating connector 28 of the heavy load 12. The horizontal lifting member 64 perpendicularly connects to vertical members 34.

According to an embodiment, the trailer further includes a stabilizer bar 17 which is removably installed. The stabilizer bar 17 is normally removed prior to backing up the trailer 10 toward the heavy load 12. Once the heavy load 12 is well installed on the removable supporting section 44, the stabilizer bar 17 is installed to stabilize the back of the base frame 14.

According to an embodiment, the trailer 10 may further include a pull and push mating connector 56 connected to the base frame 14 for removably engaging with another pull and push mating connector of a vehicle (not shown).

According to another embodiment, the base frame 14 may further include, without limitations, one of skis 55, wheels, tracks or the like for enabling displacement of the base frame 14 in the lateral direction relative to the ground surface.

In the embodiment where skis are used as the interface with the ground, the trailer 10 is normally hooked to a snow groomer (not shown). This embodiment is particularly useful when the heavy load 12 are in remote locations which are difficult to access, for example, in winter time when the ground and access roads are covered with snow or rendered inaccessible thereby. In such situations, the snow groomer travels over the snow and pulls the trailer 10 over the snow as well thereby eliminating the need to clear the access roads to the heavy load 12. This is especially practical in the situation where the heavy load 12 comprises an electrical transformer and the electrical transformer must be replaced or moved for maintenance.

According to another embodiment, the base frame 14 of the trailer 10 may further include a brake system 60, opposite to the opening 16 defined by the base frame 14 for immobilizing the base frame 14 when the trailer 10 becomes unhooked from the vehicle which is pulling it. The brake system 60 includes a plurality of rigid elements 62 (e.g., teeth) which extends downwardly from a horizontal bar of the base frame 14.

According to another embodiment, the lifting frame 24, the base frame 14 and the structural frame 18 define a square cross-sectional area. However, a person skilled in the art would also consider defining a different cross-sectional area for the lifting frame 24, the base frame 14 and the structural frame 18. The cross-sectional area may define, without limitation, an elliptic cross-sectional area, a regular polygonal cross-sectional area, an irregular polygonal cross-sectional area, a circular cross-sectional area and the like.

Figure 5:
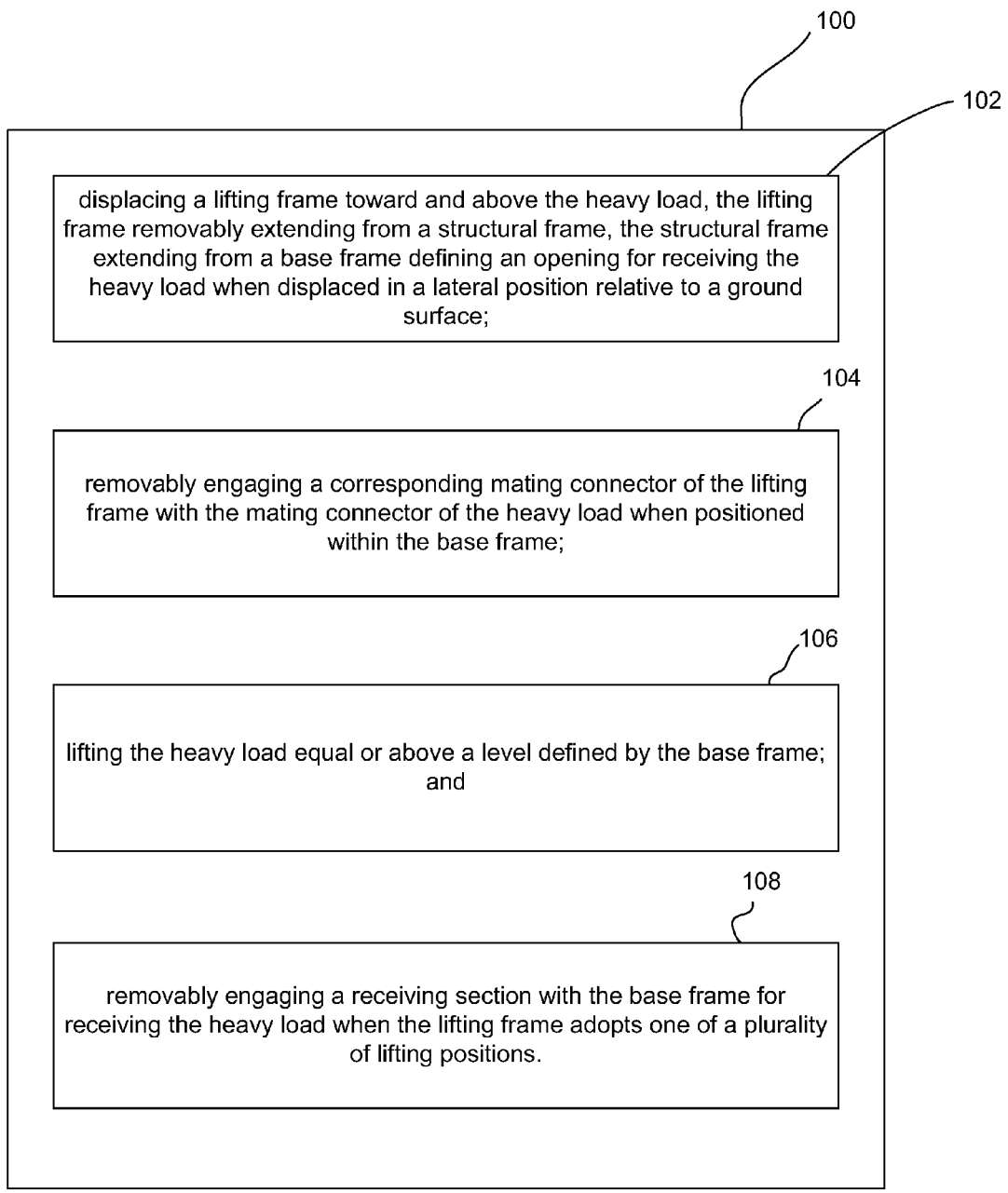
FIG. 5 is a flowchart illustrating a method for lifting a heavy load in accordance with another embodiment.

According to another embodiment and referring now to FIG. 5 and the previously described figures, there is shown a method 100 for lifting a heavy load which defines an external surface and a mating connector on the external surface. The method 100 includes step 102 of laterally displacing (e.g., backing up) the opening of the trailer 10 until the lifting frame is positioned above the heavy load. The method 100 then proceeds to step 104 of adjusting the height of the lifting frame so that a corresponding mating connector of the lifting frame with the mating connector of the heavy load when positioned within the base frame may be engaged (using a pin or bolt and nut or other suitable means).

Once the mating connectors well engaged, the method 100 proceeds to step 106 of lifting the heavy load of its base at a height equal or above a level defined by the base frame. It is presumed that the heavy load was previously detached from its base if necessary.

The lifting step 106 includes the following sub-steps. In not already done, pins 38 are placed in all holes 47 of sliding adaptor 49. At this point, sliding adaptors 49 are resting on vertical posts 19 and vertical lifting bars 21 are locked with vertical members 34. Jacks 39 are operated to lift the vertical lifting bars 21, vertical members 34 and heavy load 12 assembly in the vertical direction until the next holes 40 within the vertical posts 19 are aligned with holes 42. At this point, other pins 38 are inserted in holes 42 and next holes 40. This ensures that vertical members 34 are locked with vertical posts 19. Pins 38 which were first installed can now be removed and vertical lifting bars 21 can be lowered until sliding adaptors 49 are resting on vertical posts 19 again. Pins 38 are then placed again in all holes 47 thereby ensuring again that vertical lifting bars 21 are locked with vertical members 34. The other pins 38 which are in holes 42 can now be removed and the lifting operation can be repeated until the heavy load 12 is at the desired height to permit the installation of the supporting section 44.

Supporting section 44 is then removably engaged (installed) with the base frame for supporting the heavy load 12 (step 108). The heavy load 12 is now ready to be lowered onto the supporting section 44 (step 110). With other pins 38 in place in holes 42, the vertical lifting bars 21 are raised until they are aligned with holes 40 at a height which the jacks 39 are able to reach. Pins 38 are placed in all holes 47 of sliding adaptor 49 to lock vertical lifting bars 21 with vertical members 34. Jacks 39 are operated until they reach the jack pushing sections 43. Other pins 38 are then removed and the jacks 39 are operated to lower the vertical lifting bars 21, vertical members 34 and heavy load 12 assembly until sliding adaptors 49 are resting on vertical posts 19 and next holes 40 within the vertical posts 19 are aligned with holes 42. Other pins 38 can then be installed again in holes 42 and the lowering operation repeated until the heavy load is resting on the supporting sections 44. The load remains attached by the mating connectors and the stabilizer bar 17 is installed to stabilize the back of the base frame 14. The trailer 10 with the heavy load 12 is now ready to be pulled of its base and moved to its intended destination.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A trailer for lifting a heavy load, the trailer comprising:
a base frame defining an opening for receiving the heavy load upon displacement of the trailer toward the heavy load;
a structural frame upwardly extending from the base frame, the structural frame including a lifting frame, wherein in use the lifting frame is positioned at least in part above the heavy load and from which the heavy load is removably attached, the lifting frame further comprising vertical members configured for movably engaging the structural frame; and
a lifting device for controlling a position of the lifting frame for vertically lifting or lowering the heavy load while it is removably attached to the lifting frame and thereby to permit displacement of the heavy load with the trailer, the lifting device further comprising sliding adaptors through which the vertical members are free to slide, each of the sliding adaptors comprising a hole, the lifting device further comprising pins, each one of the pins for insertion respectively in the hole in each one of the sliding adaptors thereby locking the sliding adaptors with their respective vertical members, wherein the vertical members of the lifting frame movably extend from the structural frame, through the sliding adaptors, for adopting a plurality of vertical lifting positions relative to the structural frame.

2. The trailer of claim 1, wherein the lifting frame includes a corresponding mating connector downwardly extending towards the heavy load for removably engaging with a mating connector of the heavy load when positioned within the base frame.

3. The trailer of claim 2, wherein the lifting device is located between the structural frame and the lifting frame for lifting the lifting frame from one of the plurality of vertical lifting positions to another one of the plurality of vertical lifting positions, thereby lifting the heavy load over the base frame.

4. The trailer of claim 2, wherein the corresponding mating connector of the lifting frame is movable and adjustable to engage with the mating connector of the heavy load in a vertical relationship.

5. The trailer of claim 4, wherein the corresponding mating connector comprises an extending section being perpendicular to and downwardly extending from a horizontal lifting member of the lifting frame, the extending section comprising a plurality of holes, the corresponding mating connector further comprising a strap extending from one of the plurality of holes for engaging with the mating connector of the heavy load.

6. The trailer of claim 1, wherein at least one of the vertical members comprises a plurality of holes, and wherein one of the plurality of holes in the vertical members and the hole in each one of the sliding adaptors are defined for receiving the pin for lifting the lifting frame and a part of the lifting device in one of the plurality of vertical lifting positions relative to the structural frame.

7. The trailer of claim 1, wherein the heavy load defines a width W1 and wherein the opening defined by the base frame defines a width W2 greater than the width W1.

8. The trailer of claim 1, wherein the base frame defines a longitudinal plan and the structural frame defines a vertical direction and wherein the vertical direction of the structural frame is substantially perpendicular to the longitudinal plan of the base frame.

9. The trailer of claim 1, further comprising a removable supporting section removably engaged with the base frame for supporting the heavy load after lifting of the heavy load.

10. The trailer of claim 9, wherein the removable supporting section comprises a plurality of primary transversal bars engaged with the base frame and a plurality of secondary transversal bars perpendicularly removably fixed to the plurality of primary transversal bars.

11. The trailer of claim 1, wherein the base frame further comprises skis for displacing the base frame in a lateral direction.

12. The trailer of claim 1, wherein the base frame further comprises a brake system opposite to the opening defined by the base frame for braking the base frame.

13. The trailer of claim 12, wherein the brake system comprises a plurality of rigid elements extending downwardly from the base frame.

14. The trailer of claim 12, wherein the lifting frame, the base frame and the structural frame define a squared cross-sectional area.

15. The trailer of claim 1, wherein the lifting device further includes a jack having a bottom end and pushing end, a jack supporting section for supporting the bottom end of the jack, and a jack pushing section for interfacing with the pushing end of the jack.

16. The trailer of claim 15, wherein the jack supporting section extends from the structural frame.

17. The trailer of claim 1, wherein the lifting device further comprises a vertical lifting bar extending between two of the sliding adaptors.

18. The trailer of claim 17, further wherein the lifting device comprises at least one of a hydraulic lifting device.

19. The trailer of claim 18, wherein the lifting device is in contact with the vertical lifting bar and pushes thereon.

20. A method for lifting a heavy load defining an external surface and a mating connector on the external surface, the method comprising the steps of:
   displacing a lifting frame toward and above the heavy load, the lifting frame comprising vertical members removably extending from a structural frame, the structural frame extending from a base frame defining an opening for receiving the heavy load when displaced in a lateral position relative to a ground surface;
   removably engaging a corresponding mating connector of the lifting frame with the mating connector of the heavy load when positioned within the base frame;
   lifting the heavy load equal to or above a level defined by the base frame, the lifting comprises:
      placing a pin in a hole of each of a plurality of sliding adaptors and a corresponding one of a plurality of holes in each of the vertical members thereby locking the sliding adaptors with the lifting frame, the sliding adaptors having a vertical lifting bar extending therefrom and wherein the vertical members of the lifting frame movably extend from the structural frame, through the sliding adaptors, for adopting a plurality of vertical lifting positions relative to the structural frame; and
      operating jacks to lift the vertical lifting bar thereby also lifting the vertical members and the heavy load in the vertical direction until one of the holes within each of the vertical members is aligned with a respective hole in the structural frame and until the heavy load is at a desired height to permit the installation of a supporting section; and
   removably engaging the supporting section with the base frame for supporting the heavy load when the lifting frame adopts one of the plurality of lifting positions.

\* \* \* \* \*